United States Patent [19]
Roberts

[11] Patent Number: 4,662,974
[45] Date of Patent: May 5, 1987

[54] METHOD OF DISPENSING FROM A CARTRIDGE FOR THERMOPLASTIC ARTICLES

[76] Inventor: John T. Roberts, Rte. 5, Box 198B, Clover, S.C. 29710

[21] Appl. No.: 688,542

[22] Filed: Mar. 29, 1985

Related U.S. Application Data

[62] Division of Ser. No. 421,859, Sep. 23, 1982.

[51] Int. Cl.$^4$ ............................................. B32B 31/18
[52] U.S. Cl. .................................... 156/344; 156/250; 221/1
[58] Field of Search ....................... 156/250, 251, 344; 221/26, 1, 268; 412/6

[56] References Cited

U.S. PATENT DOCUMENTS

| 230,632 | 8/1880 | Hubbard | 206/343 |
| 3,287,195 | 11/1966 | Piazze | 156/251 |
| 3,330,058 | 7/1967 | Lefever | 227/120 X |
| 3,412,895 | 11/1968 | Hilton | 221/268 X |

FOREIGN PATENT DOCUMENTS 2043344 3/1972 Fed. Rep. of Germany .

Primary Examiner—Robert A. Dawson
Attorney, Agent, or Firm—Bailey & Hardaway

[57] ABSTRACT

A group of individual thermoplastic articles are arranged in a dispensing relationship by fusion-bonding individual articles to one another so as to form a cartridge for dispensing purposes.

1 Claim, 6 Drawing Figures

METHOD OF DISPENSING FROM A CARTRIDGE FOR THERMOPLASTIC ARTICLES

This application is a division of application Ser. No. 421,859 filed Sept. 23, 1982.

BACKGROUND OF THE INVENTION

This invention relates generally to the art of dispensing and more particularly to a novel dispensing cartridge for thermoplastic articles.

Dispensing of articles in automatic fashion has been of significant interest in the transition from manual processing to machine processing of various items. Dispensing techniques have been particularly well-developed in the area of packaging. Examples of such technology include the automatic dispensing of plastic bags, one at a time, by having such bags arranged in a shingled relationship along a taped carrier. Additionally, such bags have been shingled to one another utilizing heat seals between individual bags. The overall object of such arrangement is to facilitate the dispensing of such bags utilizing automated equipment.

Associated with such technology in the packaging art are various items of rigid plastic material which must be dispensed one at a time in order to have some association with a bag or a packaged article.

One such device is described in U.S. Pat. No. 3,270,874 to Hilton, where individual plastic bag closures such as the type normally used on bread packages are arranged together in a unitary, side-by-side relationship with scores between individual articles to facilitate the severance of individual articles from the initary strip. Such articles are severed by merely bending the strip at the point of score. This product is arranged primarily for manual dispensing.

A dispensing mechanism is described in U.S. Pat. No. 2,939,147 to Jacobson, wherein curtain hooks are arranged for automatic dispensing, one at a time, such that the clips are stacked together and connected together by a spline which maintains the hooks in the stacked relationship, and facilitates loading into a magazine where they are dispensed one at a time from the stack.

Another dispensing device is described in U.S. Pat. No. 3,165,968 to Anstett wherein a plastic nailing strip is utilized to connect together individual nail articles for the purpose of dispensing the articles one at a time with automated equipment. A similar device is described in U.S. Pat. No. 3,357,761 to Lagas et al.

In facilitating the marketing of retail items, it has been known in the prior art to utilize rigid thermoplastic hooks or hanger attachments to individual articles for displaying such articles in a retail environment. In the past such hooks have been dispensed from a loose cartridge for stapling or other means of attachment to a marketable item. Such individual hooks have been arranged within magazines manually in loose stacks. Such arrangement has required great skill on the part of the operator in order to assure loading of large numbers of such hooks in a stacked relationship. Essentially, such loading requires movement of large numbers of hooks within a stack by utilizing only hand pressure at both ends to maintain the stack in alignment, while hoping that the central area of the stack did not collapse to produce a disoriented array of hooks which must be again manually restacked for purposes of loading into a dispensing magazine.

SUMMARY OF THE INVENTION

It is thus an object of this invention to provide a novel cartridge of thermoplastic articles for dispensing purposes.

It is a further object of this invention to provide a cartridge of individual thermoplastic materials for use within a dispensing magazine without the use of extraneous attachment material.

It is still a further and more particular object of this invention to provide such a cartridge which is not subject to operator skill in the loading of such cartridge into a magazine.

These as well as other objects are accomplished by a group of individual thermoplastic articles arranged in a stacked relationship for seriatim dispensing thereof, with said individual thermoplastic articles being bound together by a fusion bond between individual thermoplastic articles.

DETAILED DESCRIPTION

In accordance with this invention it has been found that a group of individual thermoplastic articles may be arranged in a stacked relationship for seriatim dispensing thereof formed into a generally connected cartridge by a fusion bond between individual thermoplastic articles. The article in accordance with this invention is thus essentially unified and fixed so as to facilitate movement and the loading thereof without any disarray created in the relationship by operator skill. Additionally, the individual articles are readily sheared from the cartridge without leaving behind extraneous matter to foul the dispensing mechanism or work area. Various advantages and features of the invention will be apparent from the following description given with reference to the various figures of drawing.

Figure 1:
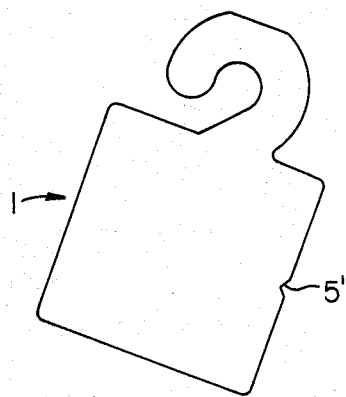
FIG. 1 of the drawings illustrates a thermoplastic article in accordance with this invention.

FIG. 1 of the drawings illustrates an individual thermoplastic article 1, which in this instance is a flat thermoplastic hook for use in the display and marketing of retail items.

Figure 2:
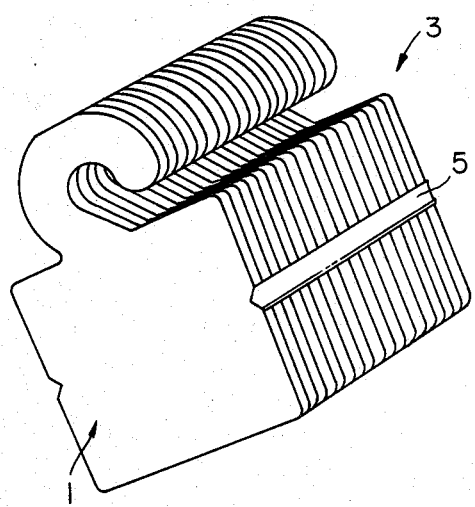
FIG. 2 of the drawings illustrates the thermoplastic article of FIG. 1 formed into a cartridge in accordance with this invention.

FIG. 2 of the drawings illustrates the individual thermoplastic article 1, arranged into a cartridge 3, for ultimate utilization within a magazine of a dispensing apparatus.

It is seen from FIG. 2 of the drawings that the cartridge 3 is formed by a fusion bond 5 along the edges of individual thermoplastic articles 1. The cartridge is formed by a stacked relationship of the individual thermoplastic articles 1, such that individual thermoplastic articles 1 may be sheared from the cartridge in seriatim fashion .

Figure 3:
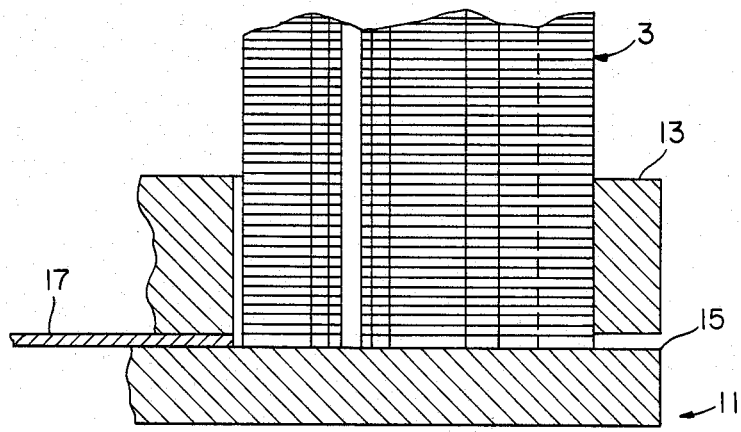
FIGS. 3 and 4 illustrate the dispensing of an individual thermoplastic article from the cartridge illustrated in FIG. 2 of the drawinngs.

FIG. 3 of the drawings illustrates a dispensing mechanism 11, which comprises means defining a magazine 13, a surface 15 upon which cartridge 3 rests, and a shear blade 17 for shearing individual thermoplastic articles 1 from cartridge 3.

Figure 4:
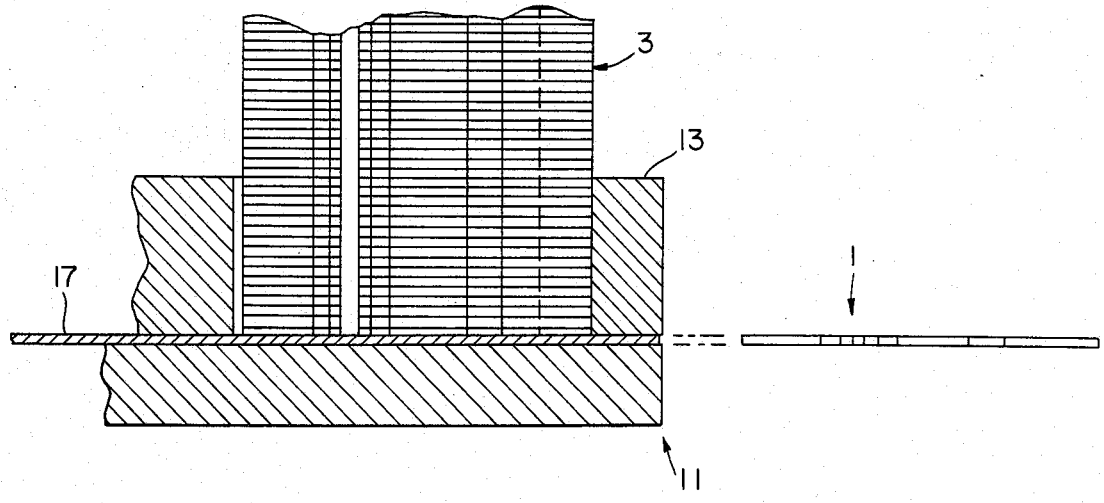

FIG. 4 of the drawings illustrates the apparatus of FIG. 3 with shear blade 17 having severed an individual article 1 from cartridge 3. It is thus seen that the cartridge 3 may be readily loaded into the magazine 13 without great skill required on the part of the operator to maintain the essentially card house array of individual thermoplastic articles since the fusion bond 5 maintains the array without adding extraneous matter to the cartridge and thus eliminating the need for somehow disposing of such extraneous matter once dispensing has occurred.

The dispensing cartridge in accordance with this invention may be formed from individual articles of essentially any thermoplastic materials which are capable of being fusion-bonded together. The more prominently useful thermoplastic materials currently utilized for commercial applications include the polyolefins and copolymers of olefins with polyethylene, polypropylene and copolymers of ethylene and propylene with ethylene vinyl acetate being extensively utilized material because of the low cost thereof. This invention is, however, applicable to virtually any article formed from a thermoplastic material. Cartridges of the type illustrated in FIG. 2 of the drawings may be formed utilizing literally hundreds of individual thermoplastic articles which is significantly more than any skilled operator could manually handle in one loading operation. The increased operator efficiency brought about by utilization of this invention is surprising and unexpected.

The heat seal 5 illustrated in FIG. 2 of the drawings is formed by merely contacting a stack of individual articles with an object which is heated to substantially the softening point of the thermoplastic material or slightly higher so as to effect the fusion bond. FIG. 1 of the drawings illustrates a relic 5' of the fusion bond after the individual thermoplastic article 1 has been dispensed from the cartridge. Preferably, the fusion bond 5 is effected by the placement of a heated, teflon-coated, metallic rod along the length of the stack of individual items 1. The fusion bond, however, may be brought about by means other than a heated rod, such as ultrasonic welding.

Figure 5:
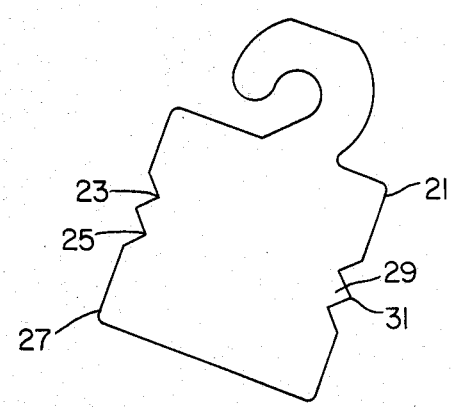
FIG. 5 of the drawings illustrates an individual thermoplastic article in accordance with a preferred embodiment of this invention.
Figure 6:
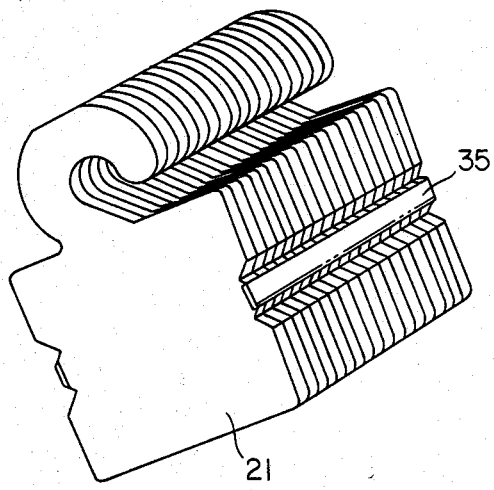
FIG. 6 of the drawings illustrates a heat seal produced in the article of FIG. 5.

A particulary preferred embodiment of this invention is illustrated in FIG. 5 of the drawings wherein an individual thermoplastic article 21 is formed having notches 23 and 25 in the edge 27 thereof. It is seen that notches 23 and 25 define a generally triangular cross-section 29 having a point 31 thereon. A heat seal may thus be effected along point 31 thereof which results in the flattening of the triangular area 29 into notches 23 and 25. The strength of the bond may thus be determined by the degree of flattening of triangle 29. FIG. 6 of the drawings illustrates the appearance of individual article 21 after a heat seal 35 has been effected by attaching individual triangular area to adjacent thermoplastic articles 21. Great control over the strength of the bond is thus brought about by this arrangement while permitting the heat seal to be effected without effecting the extra perimeter area of the individual article 21.

Preferably, the individual articles of this invention are formed by stamping the individual thermoplastic article from a sheet of rigid or semi-rigid material. The stamped item is loaded into a magazine which is adjacent the cutting die such that no disorientation occurs between individual articles during the forming process. The heat seal is thus effected while the dual articles are still within a magazine associated with the cutting dies. Complete cartridges in accordance with this invention may be thus unloaded from the magazine associated with the forming process, and shipped to remote locations for utilization on automated equipment. It is understood, however, that the articles of this invention may be formed by other processes, such as injection molding.

It is thus apparent that the invention disclosed herein provides a cartridge of individual thermoplastic articles attached together without extraneous material to thus facilitate the loading of dispensing magazines without requiring extensive operator skill, and permitting the loading of a significantly greater number of individual articles than could heretofore be carried out by human operator. As many variations will be apparent from a reading of the above description, such variations are embodied within the spirit and scope of this invention as defined by the following appended claims.

What is claimed is:

1. A process for dispensing individual thermoplastic articles, said articles being arranged in a stacked relationship for seriatim dispensing of individual articles, said individual thermoplastic articles having a generally planar interface between adjacent stacked articles and being bonded together, by a fusion bond between individual thermoplastic articles to form a unitary self-supporting cartridge for dispensing, comprising the steps of:

placing said cartridge within a dispensing magazine; and shearing individual articles one at a time from said cartridge in a direction substantially parallel to said planar interface with said shearing action severing said fusion bond without generating extraneous material.

* * * * *